Dec. 11, 1956     C. J. KETTLER     2,773,311
OPTICAL MICROMETER
Filed Nov. 12, 1953
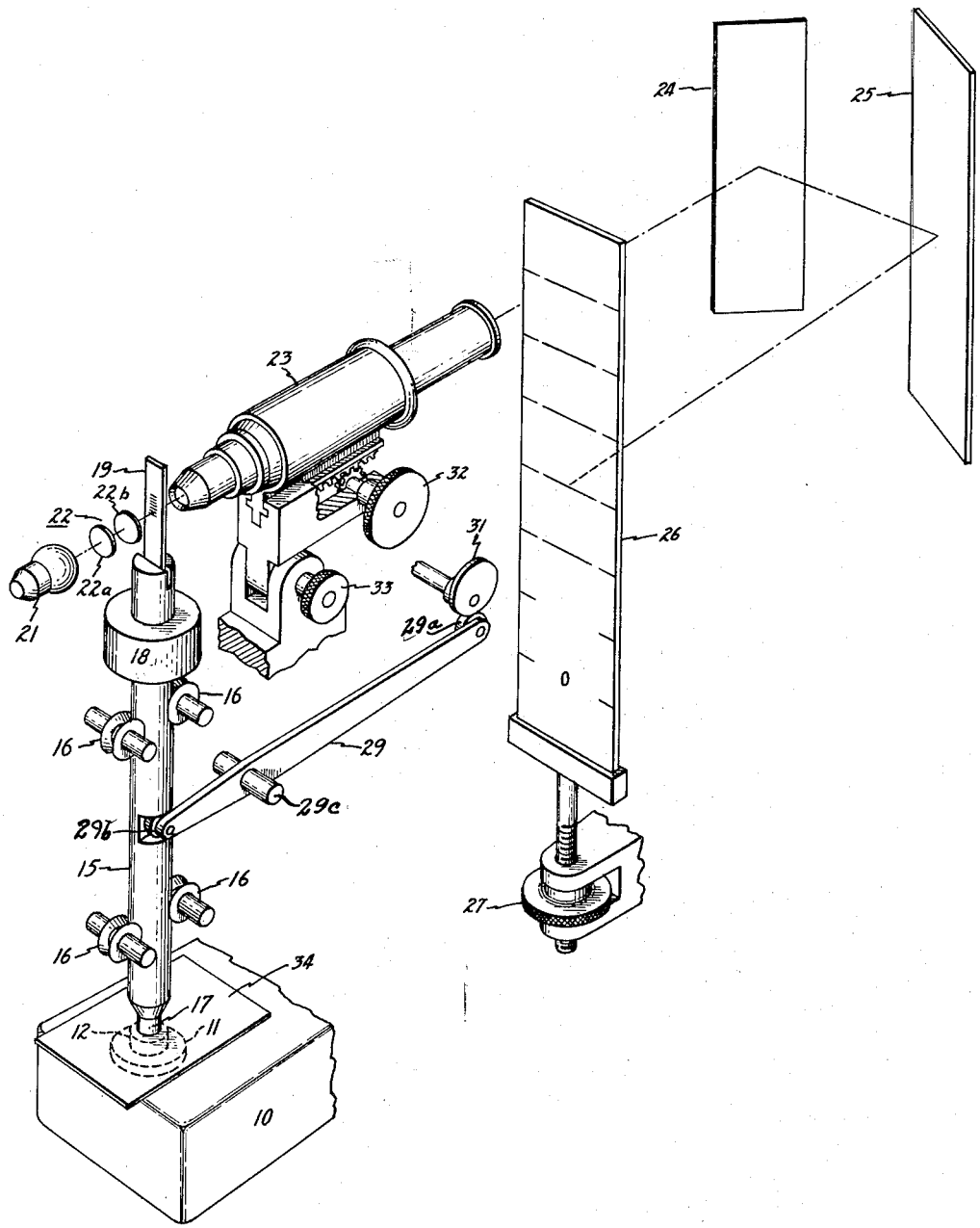
Inventor
Clarence J. Kettler,
by Gilbert P. Tarleton
His Attorney.

United States Patent Office 2,773,311
Patented Dec. 11, 1956

2,773,311

OPTICAL MICROMETER

Clarence J. Kettler, Stockbridge, Mass., assignor to General Electric Company, a corporation of New York Application November 12, 1953, Serial No. 391,428

3 Claims. (Cl. 33—147)

This invention relates to a micrometer. More particularly, the invention relates to a micrometer particularly adapted to measuring the thickness of sheets of paper.

It is an object of this invention to provide a micrometer suitable for the quick measure of paper thickness.

It is another object of this invention to provide a fast operating micrometer in which there is no mechanical linkage between the measuring section and the indicator scale.

It is a further object of this invention to provide a direct reading micrometer.

The above and other objects may be accomplished in accordance with my invention as set forth in the following specification and illustrated in the accompanying drawing which is a cut away perspective view of the device of this invention.

Briefly stated, in accordance with one of its aspects, the micrometer of this invention comprises a stationary surface, a movable surface in mating relation with the stationary surface, a reticule linked to the movable surface, and fixedly positioned with reference thereto, and a stationary optical system having a light path through the reticule, the optical system serving to magnify the markings of the reticule whereby the measurement of a small distance is indicated in greatly magnified form on a viewing screen.

Referring to the drawing, the micrometer has a base 10 on the forepart of which is mounted an anvil holder 11 in which is positioned an anvil 12 having a smooth horizontal top surface.

Positioned above the anvil 12 is a rod or column 15 vertically movable within the space between four guide wheels 16. The lower portion of the rod 15 terminates in a smooth gauging button or section 17 positioned in mating relation to the surface of the anvil 12. A weight 18 positioned on the column 15 assists gravity in forcing the column 15 in a downward direction so that its terminating surface makes contact with the anvil 12.

Mounted on the upper end of the column 15 is a reticule 19 consisting of a transparent member having a plurality of horizontal lines ruled thereon at spaced intervals. Conveniently these lines may be about 0.001 inch apart. As the rod 15 moves up or down the reticule 19 moves with it. Other parts of the device remain stationary during use of the device and thus the distance between the gauging button 17 and the surface of the anvil 12 is determined by the movement of a single assembly. Obviously, movement of the rod 15 may be biased by a means other than gravity.

Mounted in fixed relation to the base 10 is an optical system having a light path through the reticule 19. The purpose of the optical system is to multiply by about one thousand the movement of the reticule 19. The optical system includes a lamp 21, a collecting and condensing lens arrangement 22, an enlarging lens system 23, a pair of reflecting surfaces 24 and 25, and a translucent viewing screen 26. The viewing screen 26 may include scale markings having a vernier to assist in making accurate measurements of very thin sheets of paper, and may be raised or lowered by means of a set screw 27 in order to provide a zero setting when the surface 17 is in contact with the anvil 12.

A lever arm 29 actuated by a motor-driven eccentric 31 is connected to the column 15 and serves to impart an up-and-down motion to the column. This provides a rate control of the pressure applied to sheet material undergoing measurement for thickness. This means of applying pressure is particularly useful where the device is used to measure the thickness of a plurality of sheets of paper in which event it is desired to press out the air between the sheets over an interval of time. As shown in the drawing, the means for cyclically imparting the described motion to column 15 comprises a separable or lost motion connection between rotatable cam 31 and member 29a secured at one end of lever 29, with the opposite end of lever 29 engaging column 15 at member 29b, so that during rotation of cam 31, lever 29 is oscillated about the axis of its pivot mounting 29c to alternately raise column 15 and allow it to move downwardly.

The magnifying portion of the optical system is provided with a focus control 32 and a tilt control 33 which are utilized in the initial adjustment of the device. The setting of the controls 32 and 33 is permanent after the machine is given a proper initial adjustment.

During operation of the device light from the lamp 21 passes though a collecting lens 22a and a condensing lens 22b of the lens system 22. The reticule 19 is positioned between the condensing lens system 22 and enlarging lens system 23. Light, after passage through the reticule 19, proceeds through the enlarging lens system 23, which may be a standard microscope achromatic lens system designed to impart a total magnification of about 430 diameters.

After emerging from the enlarging lens system 23 light is reflected from the reflecting surface 24 to the reflecting surface 25 from which it is passed to the viewing screen 26.

While the invention is not limited as to dimensions of the parts, it is desirable that the reticular markings be enlarged by a factor of about 1000. This may be accomplished with an enlarging lens system giving a magnification of 430 diameters by positioning the first reflecting surface 24 221 millimeters from the enlarging lens system 23; by positioning the reflecting surface 25 100 millimeters from the reflecting surface 24; and by positioning the viewing screen 26 261 millimeters from the reflecting surface 25. Obviously, other dimensional arrangements and enlarging lens systems could bring about this same result.

In order to measure the thickness of a test material 34, which may be a single sheet of paper, a number of sheets of paper, or any other substance thin enough to be within the measurement range of the device, it is only necessary to lift the rod 15 and place the test paper 34 between the smooth horizontal surface at the bottom of the portion 17 and surface of the anvil 12. As soon as the reticule 19 comes to rest the thickness of the material being measured may be read directly on the viewing screen 26.

While there has been shown and described a particular embodiment of the invention, it will be obvious to those skilled in the art that changes and modifications can be made without departing from the invention; therefore, it is aimed in the appended claims to cover all such changes and modifications as fall within the true spirit and scope of the invention.

What I claim as new and desire to secure by Letters Patent of the United States is:

1. A measuring device comprising, in combination, a stationary base having a supporting surface; a movable member having an engaging surface facing said supporting surface of said stationary base and being mounted for movement toward and away from said supporting surface, said movable member being continuously biased toward said supporting surface for engaging an object to be measured on said supporting surface; a reticule having spaced markings and being attached to said movable member for movement therewith; a stationary optical system arranged with its optical axis passing through said reticule and being operative to magnify the spacing of the markings thereon; and moving means connected to said movable member for cyclically moving the same away from said supporting surface of said stationary base and permitting its biased return movement toward said supporting surface, said moving means including a lost motion connection permitting uniform pressure to be applied by said movable member to objects of different thickness.

2. A measuring device comprising, in combination, a stationary base having a supporting surface; a movable member having an engaging surface facing said supporting surface of said stationary base and being mounted for movement toward and away from said supporting surface, said movable member being continuously biased toward said supporting surface for engaging an object to be measured on said supporting surface; a reticule having spaced markings and being attached to said movable member for movement therewith; a stationary optical system arranged with its optical axis passing through said reticule and being operative to project an image of said markings and to magnify the spacing thereof, said optical system including lens means, reflecting means and a viewing screen on which the image of said markings is projected; and moving means connected to said movable member for cyclically moving the same away from said supporting surface of said stationary base at a predetermined rate and permitting its biased return movement toward said supporting surface, said moving means comprising lever means engaging at one end said movable member and cam means operatively engaging said lever at its other end and providing a lost motion connection therewith to allow uniform pressure to be applied by said movable member to objects of different thickness.

3. A measuring device comprising, in combination, a stationary base having an upwardly facing supporting surface; an elongated reciprocable gauge member having an upper and a lower end and having at its lower end a downwardly facing engaging surface opposite to and coacting with said supporting surface of said stationary base, said reciprocable gauge member being mounted for substantially vertical movement toward and away from said supporting surface and being continuously urged by gravity toward said supporting surface for engaging an object to be measured on said supporting surface; a reticule having vertically spaced markings and being mounted on said reciprocable gauge member at the upper end thereof for movement therewith; a stationary optical system arranged with its optical axis passing through said reticule, said optical system having a viewing screen and being operative to project on said screen a magnified image of said reticule markings; and moving means connected to said reciprocable gauge member for cyclically moving the same upwardly away from said supporting surface of said stationary base at a predetermined rate and permitting its downward movement under the action of gravity, said moving means comprising a lever member mounted for pivoting about a substantially horizontal axis and engaging at one end said reciprocable gauge member, and a rotatable eccentrically mounted cam member engageable with said lever member at its other end for moving said other end downwardly so as to turn said lever member about its pivot axis for raising said reciprocable gauge member, said cam member having a separable connection with said other end of said lever member to allow uniform pressure to be applied by said reciprocable gauge member on objects of different thickness.

References Cited in the file of this patent

UNITED STATES PATENTS

| | | |
|---|---|---|
| 652,723 | Munroe | June 26, 1900 |
| 1,414,142 | Levy | Apr. 25, 1922 |
| 2,134,184 | Guyer | Oct. 25, 1938 |
| 2,296,749 | Tanner | Sept. 22, 1942 |
| 2,355,910 | Gallasch | Aug. 15, 1944 |